Figure 1:
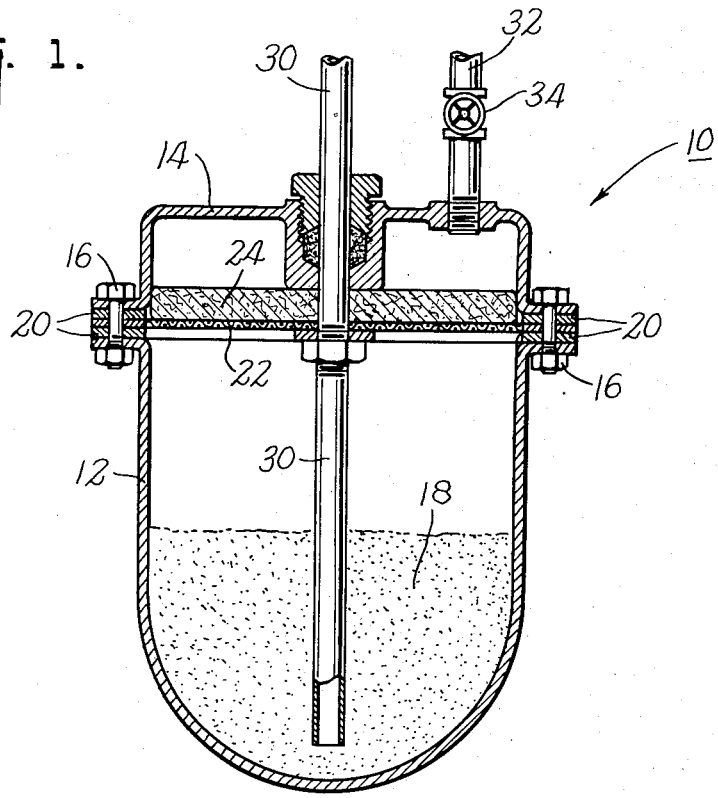

May 24, 1960 P. R. DESCHERE 2,937,752
FILTER SYSTEM
Filed Aug. 23, 1955

INVENTOR
Paul R. Deschere
BY
Curtis, Morris & Safford
ATTORNEYS

2,937,752
FILTER SYSTEM

Paul R. Deschere, 16 Park Ave., New York 16, N.Y.

Filed Aug. 23, 1955, Ser. No. 530,186

1 Claim. (Cl. 210—75)

This invention relates to a system for automatically rejuvenating the filter cake in a filter-aid type of filter unit for liquids.

An object of this invention is to provide a system for operating such a filter unit so that it can be left in use unattended for relatively long periods of time during which it will automatically maintain relatively high efficiency and capacity.

A further object is to provide a system of this kind so that the filter can be made and operated at low cost.

These and other objects will be in part pointed out in and in part understood from the description given hereinafter.

The filtering on a small scale and with very high efficiency of contaminated liquids, such as water or oil, has not been really practical heretofore with filters using filter aid. Perhaps this was due in part to the high original cost of a good filter of that type but probably the biggest deterrent to widespread use was the expense and bother of continually or frequently cleaning and tending such a unit. There is, however, a rear need for such units in small sizes in suburban home water supplies and in conjunction with the circulating liquids in automobile engines, for example. In such applications, it is most desirable to have liquids of sparkling clarity. The present invention seeks to greatly extend the usefulness of the highly efficient filter aid units by eliminating the need for their constant attention.

A liquid filer unit using filter aid (such as diatomaceous earth) uses it deposited as a filter cake, commonly called a precoat, upon a perforated septum or screen. Liquid in flowing through the unit first passes through the capillary pores of the precoat on the surface of which the actual filtering takes place, then through the filter screen which serves merely to hold the precoat in place, and thence to the outlet of the unit. When the liquid flows through the precoat, even the fines particles suspended in the liquid are strained out, these particles accumulating as slime on the outer surface of the filter cake. As the amount of slime on the surface increases, the filtering capacity of the unit progressively decreases until eventually it falls too low to be acceptable. Thereupon it is neceessary to clean out accumulated slime. This removal of the slime is generally done either by temporarily reversing liquid flow in the unit, commonly called back-washing or backflushing, or break up and discharge the filter cake with its accumulated slime, or by mechanical scraping or manual cleaning of the filter elements. In any case frequent attention to the unit is required. As a consequence such filter units are practical only for use in industrial and other large size installations where service is available and not in small, individual ones.

In accordance with the present invention a filter unit employing filter aid to obtain the highest clarifying efficiency is arranged to operate so that the cake of filter aid is automatically broken up each time liquid flow through the unit ceases. This is accomplished by placing the filter septum in a horizontal plane with a liquid reservoir containing the filter aid disposed there-beneath and by connecting the inlet anl outlet pipes to the unit so that liquid flow will be upward through the reservoir and through the septum. This liquid flow draws the filter aid against the underside of the septum where it builds up as a precoat and is held in place by the pressure differential cross the precoat and septum. By using many times the quantity of filter aid required for forming a normal precoat, there is provided enough filtering capacity to take care of the impurities filtered out of the liquid during many cycles of on-and-off operation. When liquid flow ceases, pressure is equalized throughout the system and the weight of the filter cake causes it to fall down from the septum into the liquid reservoir disintegrating as it falls. In this way, the accumulation of slime on the surface of the filter cake is limited to the amount filtered out during one cycle of filter operation, the slime which does accumulate, being dispersed throughout the mass of the filter aid partly during the fall from the septum but principally by the automatic agitation of it at the start of the next cycle. It is possible by charging a small capacity unit according to the invention with a sufficient quantity of filter aid, to obain from it unattended though highly efficient operation for periods as long as one year.

Figure 2:
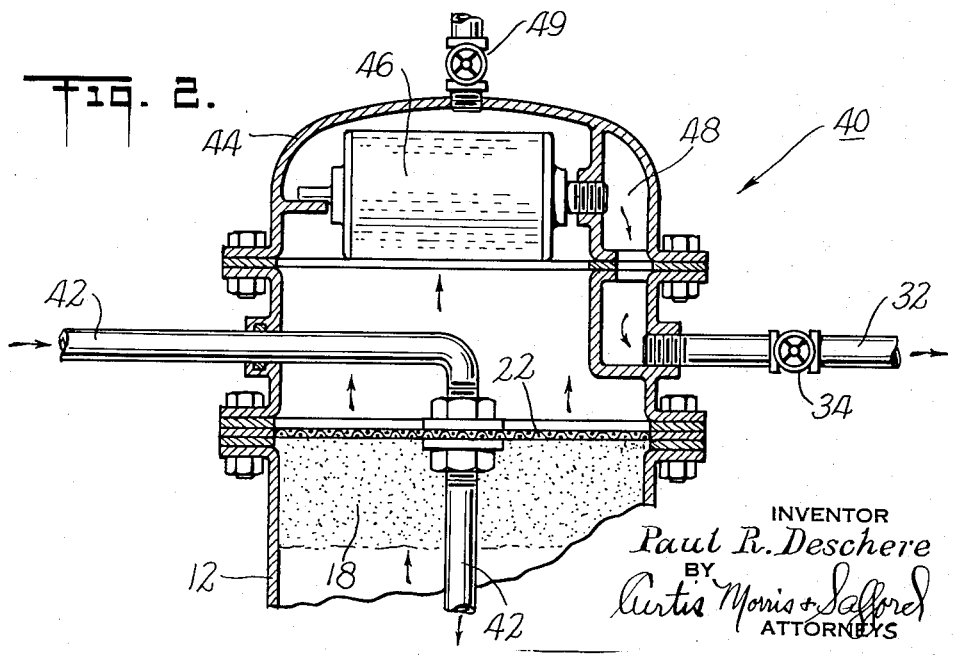

A better understanding of the invention together with a better appreciation of its many advantages will best be gained from a study of the following description given in connection with the accompanying in which:

Figure 1 is a side section view of a filter unit arranged to operate according to the invention and showing the unit when there is no liquid flow; and Figure 2 is a side section view of a slightly different unit showing it when there is liquid flow through it.

Referring now to Figure 1, filter unit 10 includes a liquid reservoir 12 and a cap 14 bolted to the former through their mating peripheral flanges by the screws 16. Reservoir 12 contains in its lower part a sizeable charge of filter aid 18. Sealed between the flanges of cap 14 and reservoir 12 is a double ring gasket 20 and the edge of a filter septum 22. This septum can, for example, advantageously be a "Nevaclog" filter plate, a porous, sintered metal plate, or a fine mesh wire screen. It is positioned in a horizontal plane. Lying on top of septum 22 is a filter pad 24 which can advantageously be made of asbestos and cellulose fibre or of felted synthetic fibres, and which traps any particles of filter aid or other material managing to pass through the septum during formation of the precoat.

Liquid from a source of supply under pressure is supplied to unit 10 through the inlet pipe 30 which passes through cap 14, pad 24 and septum 22 down nearly to the bottom of the reservoir. Joints between this pipe and the elements through which it passes are liquid sealed by suitable packing and glands. Liquid is adapted to flow through the unit upwardly from the bottom of reservoir 12 carrying the filter aid 18 with it up to septum 22. Here, the filter aid is caught and collects in a thick precoat while the liquid flows through the septum and pad and out through the discharge pipe 32. An outlet valve 34 in pipe 32 turns on or off the liquid flow through the unit.

Figure 2 shows a slightly modified filter unit 40 arranged for upward liquid flow, like in unit 10, and having the same kind of liquid reservoir 12, filter aid charge 18, and horizontal septum 22. Unit 40 is shown when there is flow through the unit so that the filter aid is formed into a thick precoat, for example, several inches thick, on the underside of septum 22. Liquid is supplied to unit 40 through an inlet pipe 42, substantially the same as pipe 30, and passes from the bottom of this pipe near the bottom of reservoir 12 and upward through the precoat and septum. On passing through the septum it enters the cap 44, which is made in two pieces as shown instead of one, and which contains the sterilizing cylinder 46. This cylinder is immersed in the liquid in cap 44 and consists of a porous ceramic container holding a quantity of oligodynamic material. Liquid flows through the walls of cylinder 46, through the material in it and out its right end to the chamber 48 and thence to outlet pipe 32. The valve 34 controls the flow of liquid as before. The active material in cylinder 46 sterilizes the liquid in the unit as explained previously.

By making cap 44 in two pieces, it is possible to remove only the upper one to replace cylinder 46. No pad 24 is required in this construction since the walls of cylinder 46 serve the same purpose. A manual air vent 49 is provided in the top of cap 44 to bleed off any air trapped therein.

When liquid flow through unit 10, or until 40, ceases there is no longer any differential pressure to hold up the precoat and, accordingly, gravity pulls it downward away from the septum. Thereafter, when liquid flow again starts, the filter aid is again agitated and stirred up so that any slime previously accumulated is mixed throughout the mass of filter aid.

By making the bottom of reservoir 12 rounded as shown and by positioning it close to the discharge end of pipe 30, or pipe 42, which is directed downward, good agitation of the filter aid by turbulent upward liquid flow is insured and moreover the reservoir is better able to withstand the internal pressure to which it is subjected.

Unit 10 can be utilized for filtering any one of many different liquids, such as drinking water, but it is particularly well suited for cleaning and purifying the oil in an automobile engine. To offer some neutralization of acid oil, a quantity of alkaline earth or suitable adsorbent material can be included with the filter aid in reservoir 12.

The above description of the invention is intended in illustration and not in limitation thereof. Various changes in the embodiment described may occur to those skilled in the art and these can be made without departing from the spirit or scope of the invention as set forth.

I claim:

An efficient, low cost method of operating a filter-aid type of liquid filter unit comprising taking a housing having a horizontal filter septum disposed therein with a liquid reservoir containing a charge of substantially unadultered filter aid beneath said septum, flowing liquid to be filtered upward through said reservoir and septum in such way as to stir up said filter aid and deposit it as a cake beneath said septum, periodically stopping the flow of liquid therethrough and allowing the cake of filter aid to fall down from said septum primarily under the action of gravity, and then resuming said flow, whereby each time the cake of said filter aid falls down from said septum it is broken up to disperse the slime on its surface and can then be redeposited on said septum with a fresh filter cake surface to give renewed filtering efficiency, and so on many times until the charge of filter aid is fully contaminated or spent.

References Cited in the file of this patent

UNITED STATES PATENTS

| | | |
|---|---|---|
| 847,537 | Abbott | Mar. 19, 1907 |
| 2,174,769 | White | Oct. 3, 1939 |
| 2,200,795 | Krieck | May 14, 1940 |
| 2,347,927 | Paterson et al. | May 2, 1944 |
| 2,468,188 | Frankenhoff | Apr. 26, 1949 |
| 2,711,994 | Quinn | June 28, 1955 |